United States Patent
Kamiya et al.

[11] Patent Number: 5,817,397
[45] Date of Patent: Oct. 6, 1998

[54] SLIDING BEARING

[75] Inventors: Soji Kamiya; Yuji Yokota; Yoshio Kumada, all of Toyota, Japan

[73] Assignee: Taiho Kogyo Co., Ltd., Aichi, Japan

[21] Appl. No.: 732,310
[22] PCT Filed: Mar. 1, 1995
[86] PCT No.: PCT/JP95/00319
    § 371 Date: Oct. 7, 1996
    § 102(e) Date: Oct. 7, 1996
[87] PCT Pub. No.: WO96/27088
    PCT Pub. Date: Sep. 6, 1996
[51] Int. Cl.⁶ .................. F16C 33/08; B32B 3/28
[52] U.S. Cl. ............ 428/141; 428/600; 428/646; 428/687; 428/156; 428/161; 428/162; 428/164; 428/172; 428/173; 428/213; 428/215; 428/925; 428/926; 428/648; 428/612; 384/283; 384/284; 384/285; 384/282; 384/912; 384/913
[58] Field of Search .................. 428/600, 646, 428/687, 141, 156, 161, 162, 164, 172, 173, 213, 215, 925, 926, 648, 612; 384/912, 913, 283, 284, 285, 282

[56] References Cited

U.S. PATENT DOCUMENTS 4,718,155  1/1988  Warriner et al. .......... 29/149.55

FOREIGN PATENT DOCUMENTS

| | | |
|---|---|---|
| 58-385507 | 8/1983 | Japan . |
| 58-48874 | 10/1983 | Japan . |
| 60-15716 | 4/1985 | Japan . |
| 60-41695 | 9/1985 | Japan . |
| 62-283216A | 12/1987 | Japan . |
| 63-6215A | 1/1988 | Japan . |
| 2-38714 | 2/1990 | Japan . |
| 2-142921 | 6/1990 | Japan . |

Primary Examiner—William P. Watkins, III
Attorney, Agent, or Firm—Flynn, Thiel, Boutell & Tanis, P.C.

[57] ABSTRACT

The surface of a lining member 3 is formed with a multiplicity of uneven surfaces 3a. The entire surface of the lining member 3 is coated by an intermediate layer 4 which comprises Ni. The surface of the intermediate layer 4 is additionally coated by an overlay layer 5 which comprises an Sn alloy. The lining member 3 has a surface roughness $t_1$, as a result of forming the uneven surfaces 3a, which is chosen to be in a range from 2 to 8 μmRz, and a thickness $t_2$ of the intermediate layer 4 is chosen to be in a range from 0.01 to 0.6 μm. When a sliding bearing 1 is heated, the overlay layer 5 and the intermediate layer 4 chemically react with each other to produce an Sn—Ni compound. As the overlay layer 5 becomes abraded, the Sn—Ni compound 6 will be exposed on the sliding contact surface. However, the described choice prevents the Sn—Ni compound from being exposed across the entire region of the sliding contact surface, thus improving the anti-seizure resistance of the sliding bearing 1.

8 Claims, 8 Drawing Sheets

SLIDING BEARING

FIELD OF THE INVENTION

The invention relates to a sliding bearing, and more particularly, to a sliding bearing which is used in an internal combustion engine.

BACKGROUND

A sliding bearing is known in the art which includes a lining member having a multiplicity of uneven surfaces formed on its surface, and in which the entire surface of the lining member, inclusive of the uneven surfaces, is coated by an intermediate layer, and the entire surface of the lining member which is coated by the intermediate layer is then additionally coated by a overlay layer, wherein recesses within the uneven surfaces are filled by an overlay layer so that when the overlay layer and the intermediate layer become abraded, the exposed surface contains the exposed lining member, the exposed intermediate layer which coats the recesses within the uneven surfaces and the exposed overlay layer which is applied to the recesses within the uneven surfaces (See, for example Japanese Laid-Open Patent Application No. 38,714/90).

In the conventional sliding bearing described above, when the overlay layer comprises Sn and the intermediate layer comprises Ni, for example, as the sliding bearing is heated by heat from the engine, Sn in the overlay layer and Ni in the intermediate layer chemically react with each other to produce an Ni—Sn compound. In the conventional sliding bearing, no consideration has been paid to the relationship between the thickness of the intermediate layer and the roughness of the uneven surfaces. Accordingly, subsequent to the formation of Ni—Sn compound, as the overlay layer which is located on the surface side thereof becomes gradually abraded, the Ni—Sn compound becomes exposed across the entire sliding surface of the sliding bearing, causing a disadvantage in that the anti-seizure resistance of the sliding bearing becomes rapidly degraded.

As a result of a study made by the present inventor concerning the relationship between the thickness of the intermediate layer and the surface roughness of the uneven surfaces, it is found that in the example given above, an Sn—Ni compound, which is found when the sliding bearing becomes heated, has a thickness which is from about twice to thrice the thickness of the intermediate layer. Accordingly, in accordance with the invention, the roughness (depth) of the uneven surfaces is chosen to be thrice the thickness of the intermediate layer or greater, so that if the Ni—Sn compound is produced as mentioned, the exposure of the Ni—Sn compound across the entire sliding surface can be prevented.

More specifically, the invention relates to a sliding bearing in which the surface of a lining member is formed with a multiplicity of uneven surfaces, the entire surface of the lining member, inclusive of the uneven surfaces, is coated by an intermediate layer, and the entire surface of the lining member which is coated by the intermediate layer is additionally coated by an overlay layer. Recesses within the uneven surfaces are filled by an overlay layer, so that when the overlay layer and the intermediate layer become abraded, the exposed surface contains the exposed lining member, the exposed intermediate layer which coats recesses within the uneven surfaces, and the exposed overlay layer which is located within the recesses in the uneven surfaces. In accordance with the invention, the thickness of the intermediate layer is chosen to be in a range from 0.01 to 0.6 μm, and the surface roughness of the lining member which results from forming the uneven surfaces is chosen to be in a range from 2 to 8 μmRz.

With this construction, when the Ni—Sn compound is produced as a result of heating of the intermediate layer and the overlay layer, the roughness (depth) of the uneven surfaces measures thrice the thickness of the intermediate layer, or greater, and accordingly, as the overlay layer becomes gradually abraded, the overlay layer remains within recesses located within the uneven surfaces, thus effectively preventing the exposure of the Ni—Sn compound across the entire sliding surface. As a consequence, the anti-seizure resistance of the sliding bearing can be improved as compared with the prior art.

BEST MODE FOR CARRYING OUT THE INVENTION

Figure 1:
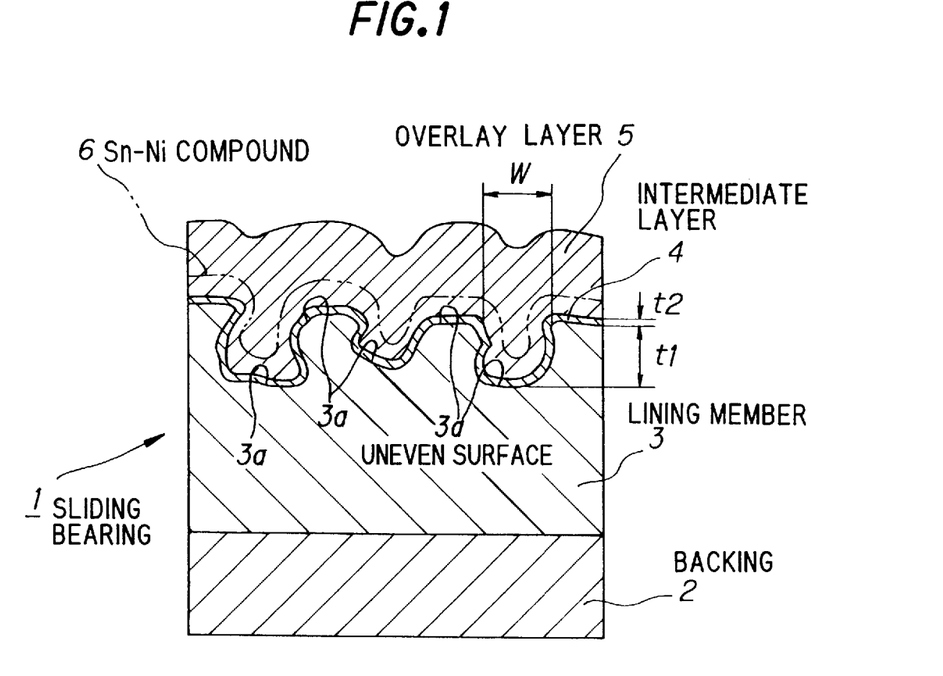
FIG. 1 is a cross section of an essential part of a sliding bearing according to one embodiment of the invention.

Referring to the drawings, several embodiments of the invention will now be described. Referring to FIG. 1, a sliding bearing 1 comprises a lining member 3 which is formed of an Al-alloy which is provided on the surface of a backing 2. The lining member 3 may be cast, cast and rolled, sintered, extruded or prepared by any other suitable technique. An Al-alloy which forms the lining member 3 may comprise Al—Sn, Al—Sn—Cu, Al—Sn—Si, Al—Sn—Cr, Al—Sn—Cr—Si, Al—Pb alloys. This alloy may include a variety of additives added thereto, as required. To give an example, a composition comprising, in percentage by weight, 12% Sn-1.5% Pb-2.8% Si-1% Cu-0.2% Cr—Al is preferred. It should be noted that the lining member 3 may be formed by a Cu-alloy as well.

The surface of the lining member 3 is formed with a multiplicity of uneven surfaces 3a by using an alkali, an acid, an electrolytic etching process or a mechanical technique such as shot blasting. The mechanical technique may include a boring operation to form groove-shaped uneven surfaces. Alternatively, the mechanical technique may comprising a boring operation in combination with an etching process to form groove-shaped uneven surfaces having a multiplicity of uneven surfaces 3a thereon. In the present embodiment, a difference in elevation of the uneven surfaces 3a formed in the surface of the lining member 3, or the surface roughness $t_1$ of the lining member 3, is chosen to be in a range from 2 to 8 $\mu$mRz. The width W of a recess, which forms the uneven surface 3a, at its opening is sized on the order of one hundred times the roughness ti in actuality, and it should be understood that the width W of the individual uneven surfaces 3a and the roughness $t_1$ are shown in exaggerated form to facilitate an understanding in FIG. 1.

An intermediate layer 4 comprising Ni is formed across the entire surface of the lining member 3, inclusive of the individual uneven surfaces 3a, by a wet plating process such as electroless or electrolytic plating or a dry plating process such as sputtering, ion plating or the like. In the present embodiment, the intermediate layer 4 has a thickness $t_2$, which is chosen to be in a range from 0.01 to 0.6 $\mu$m.

Accordingly, while the entire surface of the lining member 3, inclusive of the individual uneven surfaces 3a, is completely coated by the intermediate layer, the surface of the latter is uneven in conformity to the surfaces of the lining member 3 and the uneven surfaces 3a. Material for the intermediate layer 4 may comprise, in addition to Ni mentioned above, Cu, Cr, Fe or the like, either alone or as an alloy.

The entire surface of the intermediate layer 4 is additionally coated by a overlay layer 5, and recesses located within the uneven surfaces which are formed on the surface of the intermediate layer 4 are filled by the overlay layer 5. The overlay layer 5 comprises a Pb-alloy, which can be applied by a wet plating process such as electrolytic plating or a dry plating process such as sputtering, ion plating or the like.

To give an example of a Pb-alloy which is used to form the overlay layer 5, it may comprises Pb having one or more of 15% or less of Sn, 15% or less of In, 5% or less of Cu and 5% or less of Sb added thereto, the percentage being by weight. For example, the following compositions may be used:

8 to 15% Sn- 1 to 3% Cu—Pb 5 to 10% Sn- 10% or less of In—Pb 1 to 10% Sn- 1 to 7% In- 1% or less of Cu—Pb 5 to 10% Sn- 1 to 10% In- 1 to 4% Cu—Pb 5 to 10% Sn- 10 to 15% In- 1% or less of Cu—Pb The thickness of the overlay layer 5 is preferably in a range from 2 to 25 $\mu$m, more preferably in a range from 2 to 10 $\mu$m and most preferably in a range from 3 to 8 $\mu$m.

In this manner, it is desirable that the material for the overlay layer 5 contains Sn or In. In place of Pb-alloy, Sn itself or Sn-alloy having Sb added thereto may be employed. To give an example, an overlay comprising industrially pure Sn (having a purity of 99.5% or greater of Sn) or such an overlay having 10% or less of Sb added thereto may be employed.

As mentioned, in the present embodiment, the surface roughness $t_1$ of the lining member which is produced by the uneven surfaces 3a is chosen in a range from 2 to 8 $\mu$mRz while the thickness $t_2$ of the intermediate layer 4 is chosen to be in a range from 0.01 to 0.6 $\mu$m.

The thickness $t_2$ of the intermediate layer and the roughness $t_1$ of the uneven surfaces are chosen in this manner for the following reasons: specifically, it is found by a study conducted by the present inventor that when the overlay layer 5 comprises an Sn-alloy and the intermediate layer 4 comprises Ni in the construction of the sliding bearing 1 of the present embodiment, as the sliding bearing 1 is heated by heat from the engine, the Sn-alloy in the overlay layer 5 and Ni in the intermediate layer 4 chemically react with each other to produce an Sn—Ni compound 6, as illustrated by phantom lines in FIG. 1. It is found that the thickness of the resulting Sn—Ni compound 6 is on the order from about two times to three times the thickness of Ni in the intermediate layer 4. Accordingly, the thickness $t_2$ of the intermediate layer is chosen to be equal to or greater than three times the roughness $t_1$ of the uneven surfaces in the present embodiment.

When the sliding bearing 1 of the present embodiment constructed in the manner mentioned above is heated by heat from the internal combustion engine, the Sn-alloy in the overlay layer 5 and Ni in the intermediate layer 4 chemically react with each other to produce the Sn—Ni compound 6, as illustrated by phantom lines in FIG. 1. When the overlay layer 5 becomes gradually abraded after the Sn—Ni compound 6 is produced, the abrasion of the overlay layer 5 will proceed to a point where the outermost portion of the Sn—Ni compound 6 becomes exposed. However, it will be appreciated that at this time, the overlay layer 5 remains within recesses located within the individual uneven surfaces 3a. Thus, at locations adjacent to Sn—Ni compound 6 which is exposed on the sliding contact surface, the overlay layer 5 remains as dispersed within the individual uneven surfaces 3a. In this manner, an exposure of the Sn—Ni compound 6 over the entire region of the sliding contact surface of the sliding bearing 1 can be prevented if a gradual abrasion of the overlay layer 5 continues after the formation of the Sn—Ni compound, thus improving the anti-seizure resistance of the sliding bearing 1.

It is to be noted that when the intermediate layer comprises Cu or Fe, an Sn—Cu compound or an Sn—Fe compound will be produced. If the overlay layer contains In, an In—Ni compound or In—Cu compound will be produced. The effect of the invention is significant when the overlay component such as Sn and In and the intermediate layer produce an intermetallic compound. The effect is also significant when the intermediate layer comprises Ni or Cu. In particular, the effect of the invention is most significant when an Ni—Sn compound is produced.

By contrast, in the prior art, no consideration has been paid to the relationship between the thickness $t_2$ of the intermediate layer 4 and the roughness $t_1$ of the uneven surfaces 3a. Accordingly, with the prior art sliding bearing, as the overlay layer 5 becomes gradually abraded subsequent to the formation of the Sn—Ni compound 6, the Sn—Ni compound 6 will be exposed across the entire region of the sliding contact surface of the sliding bearing 1, whereupon the anti-seizure resistance rapidly degrades.

The effect noted in the sliding bearing of the present invention will now be described in terms of the results of experiments. The results of the experiments shown in FIGS. 2 to 5 are obtained by determining the anti-seizure resistance with respect to the product according to the invention and controls under the testing conditions and method described below.

Testing conditions:

Testing machine: anti-seizure resistance testing machine of journal type

Peripheral speed: 2.77 m/s

Shaft diameter: 42 mm

Surface pressure: 10 MPa/45 min, incrementally increased in steps

Lubricant: 7.5 W-30 engine oil of SE class

Lubricant temperature: 140±1° C.

Oil clearance: 25±5 $\mu$m

Shaft material: S45C with or without hardening

Shaft hardness: 550±50 HV1

Shaft surface roughness: 0.5±0.1 μmRz

A testing method comprises initially running the testing equipment for one hour under a surface pressure of 5 MPa as a shakedown, and subsequently the surface pressure is raised to 10 Mpa. Subsequently, the surface pressure is increased stepwise by 10 Mpa at an interval of 45 minutes while recording a friction torque and a bearing back surface temperature. A seizure is determined to have occurred when a rapid increase in the friction torque occurs, and the surface pressure at the time the friction torque exceeded 10.8 N.m is defined as a seized surface pressure. In the event a seizure occurred during the time the load is being increased, a medium value before and after the occurrence of the seizure is chosen as a seized surface pressure. It is to be noted that the lubrication takes place by an oil bath, and the testing equipment is completely immersed in the oil bath. The temperature of the lubricant oil is controlled by a separate oil feeder, which supplies the oil into the bath at a rate of 1 dm$^3$/min by circulation, and the bath temperature is controlled to be 140° C.

Figure 2:
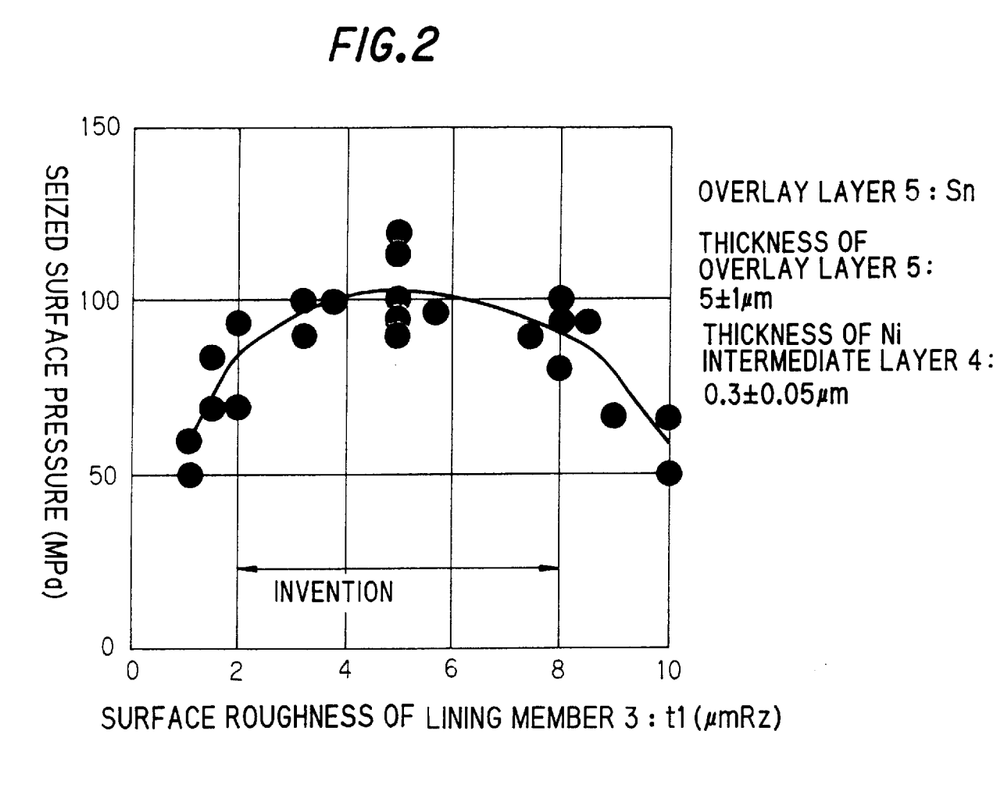
FIG. 2 graphically shows a result of an experiment conducted to illustrate the relationship between the surface roughness of lining members 3 and a seized surface pressure.

The product according to the invention which is used in the experiment, yielding the experimental results shown in FIG. 2, has a surface roughness of the lining member 3 which is in a range from 2 to 8 μmRz. By contrast, the control used has a surface roughness of the lining member 3 which is either less than 2 μmRz or greater than 8 μmRz. In both the product of the invention and the control, the overlay layer 5 comprises Sn, and has a thickness of 5±1 μm. In both the product of the invention and the control, the intermediate layer 4 comprises an Ni plating, and has a thickness of 0.3±0.05 μm. FIG. 2 graphically shows the relationship between the seized surface pressure and surface roughness $t_1$ of the lining member 3. It will be noted from FIG. 2 that the product according to the invention exhibits an increased seized surface pressure as compared with the control, and thus has its anti-seizure resistance improved.

Figure 3:
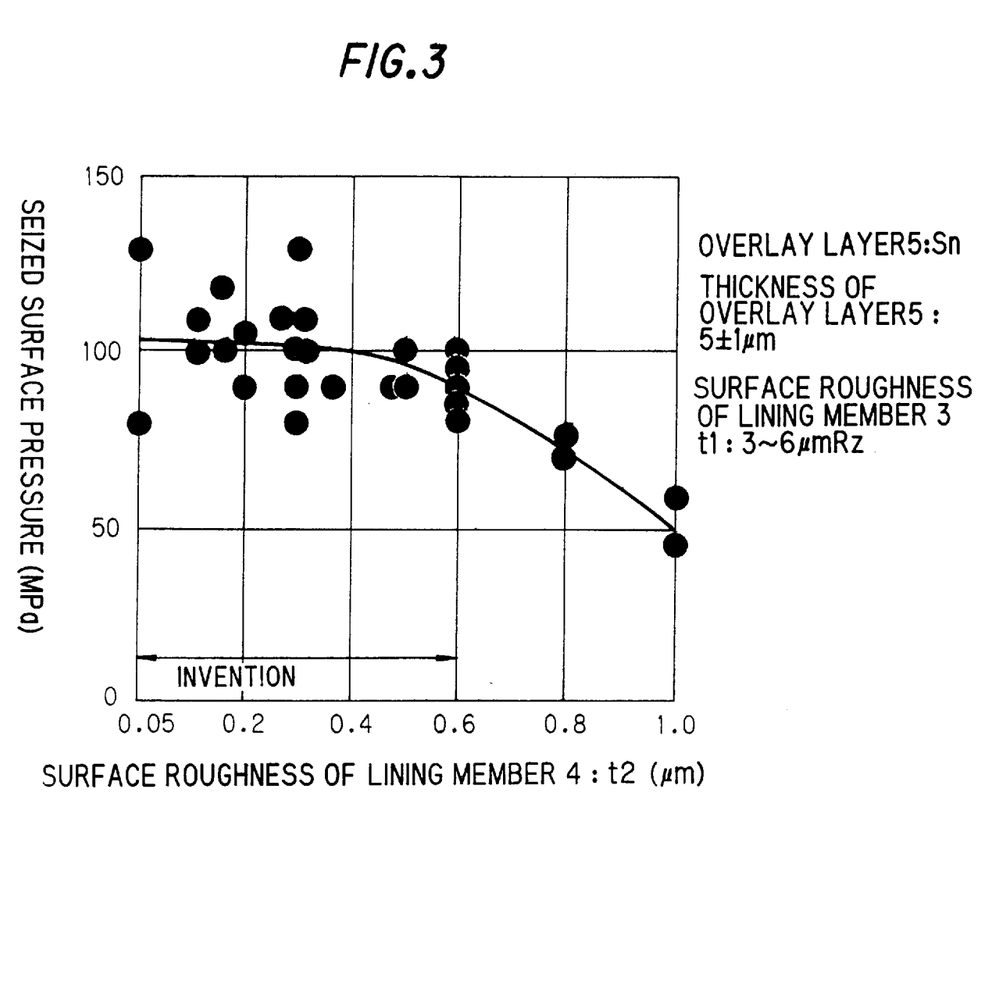
FIG. 3 graphically shows a result of an experiment conducted to illustrate the relationship between the intermediate layer 4 and a seized surface pressure.

FIG. 3 graphically illustrates the relationship between the seized surface pressure and the thickness $t_2$ of the intermediate layer 4 (Ni). With the product according to the invention in which the thickness of the intermediate layer 4 is from 0.05 to 0.6 μm, the seized surface pressure is higher than that of the control, indicating an improved anti-seizure resistance.

Figure 4:
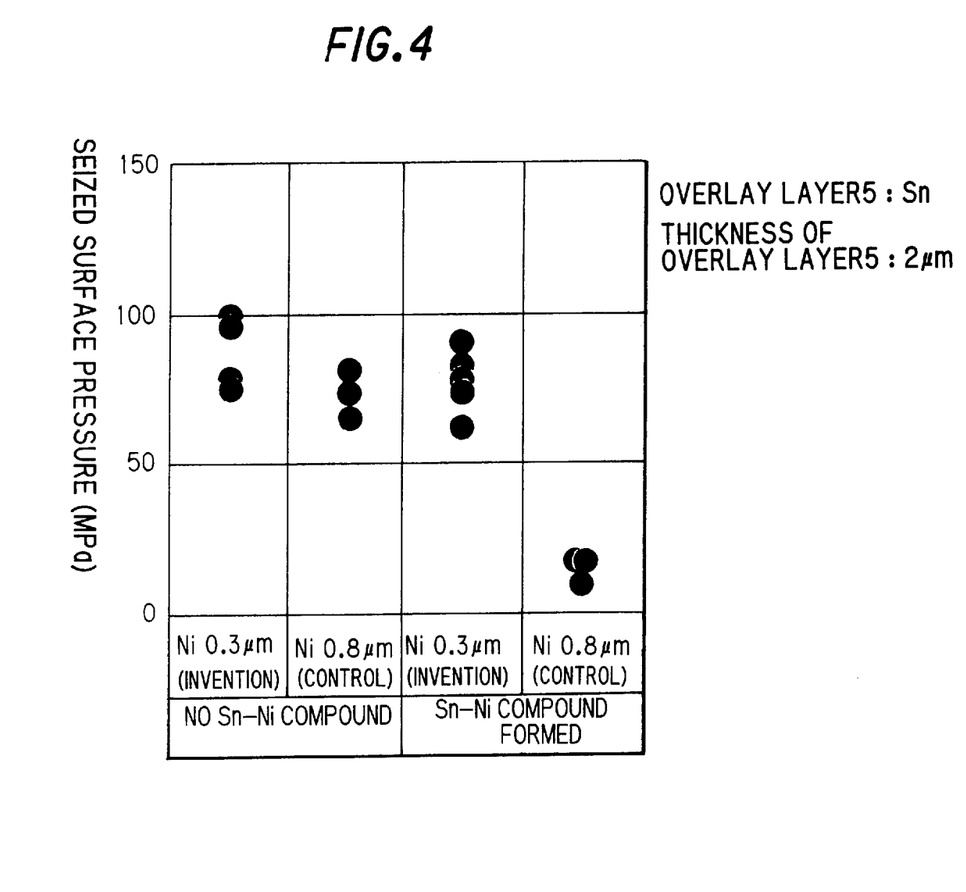
FIG. 4 graphically shows a result of an experiment illustrating differences in seized surface pressure which occur when the Sn—Ni compound is produced and when Sn—Ni compound is not produced.

FIG. 4 illustrates an experimental result of simulating an abrasion of the overlay layer 5 when the sliding bearing 1 is subjected to a thermal load comparable to that from an actual engine.

In the sliding bearing 1 according to the invention, which is constructed in the manner mentioned above, as the overlay layer 5 becomes abraded, the abraded overlay layer 5 and Ni in the intermediate layer 4 produce an Sn—Ni compound, and this Figure compares the seized surface pressure when this compound is produced and when it is not produced.

It will be noted from FIG. 4 that with the product according to the invention, a variation in the seized surface pressure between when the Sn—Ni compound is produced and when it is not produced is small, but a variation in the seized surface pressure between the presence and absence of Sn—Ni compound is much greater for the control in which the thickness t of the intermediate layer 4 (Ni) is chosen to be 0.8 μm. Thus, under a condition which is very close to an actual situation where a high thermal load is applied, the product according to the invention exhibits a far superior anti-seizure resistance as compared with the control.

Figure 5:
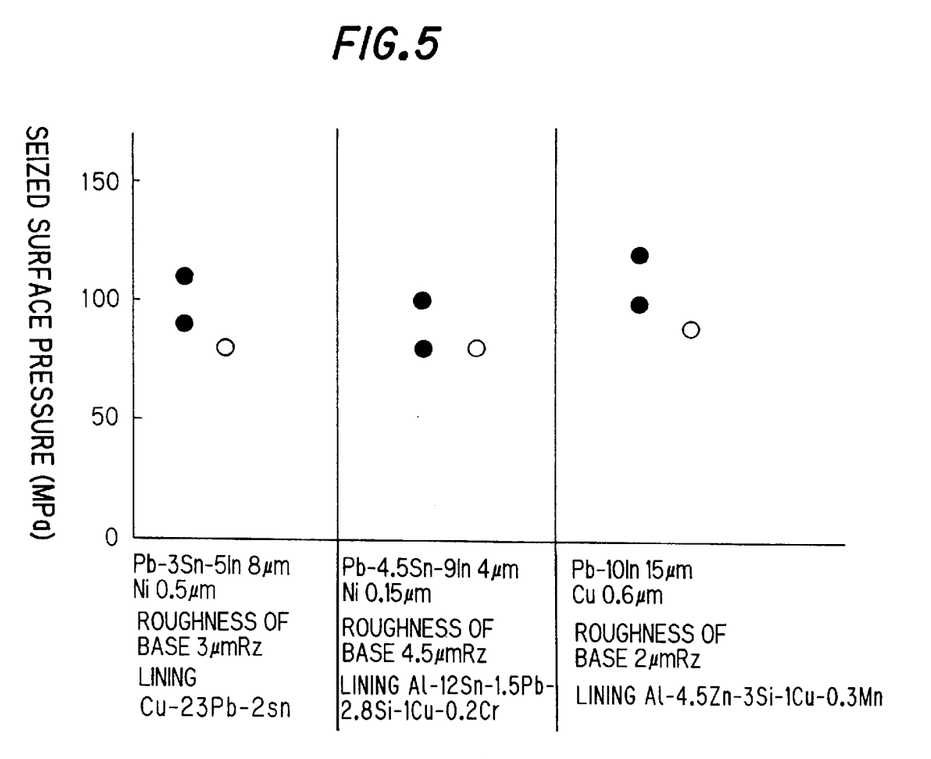
FIG. 5 graphically shows a result of another experiment illustrating a difference in the seized surface pressure occurring in another embodiment of the invention.

FIG. 5 illustrates the determination of the anti-seizure resistance under similar testing conditions as mentioned above for a different embodiment where the solid black circles correspond to testings shown in FIG. 2 and 3 while white circles correspond to testing under a similar thermal load as in FIG. 4. It will be appreciated from FIG. 5 that the anti-seizure resistance, which demonstrates the effect of the invention, is improved as compared with the control shown in FIG. 4 also when the overlay comprises a Pb material and the intermediate layer comprises Cu. When the thermal load is applied, the anti-seizure resistance is higher than that of the control.

It will be understood from the foregoing description that the anti-seizure resistance can be improved according to the invention by preventing any Ni—Sn compound, for example, which is produced from becoming exposed across the entire region of the sliding contact surface of the sliding bearing 1. In addition, if a diffusion of Sn which is contained in the overlay layer into the intermediate layer can be suppressed, thereby suppressing the resulting Ni—Sn compound being produced, the effect of the invention will be further enhanced.

To suppress a diffusion of Sn which is contained in the overlay layer into the intermediate layer, it is sufficient that the overlay layer which contains Sn also contains 0.02 to 0.5% by weight of C. This aspect will be further described below.

An overlay layer used in the prior art comprises a metal element such as Pb, Sn, Cu, In, Sb, Mn, Ni, Fe, Zr, Tl or the like, and a non-metal element such as C is merely contained therein as an unavoidable impurity. This impurity C does not alloy with a principal metal in the overlay layer, and thus is considered as being introduced from organic components in the plating bath. The content of C has not been analyzed in the prior art, but it is found from an analysis conducted by the present inventor of overlay layers used in bearings which are manufactured in a mass production that as converted to C, the presence of organic components is detectable only in a trace amount much less than 0.001% by weight.

Figure 6:
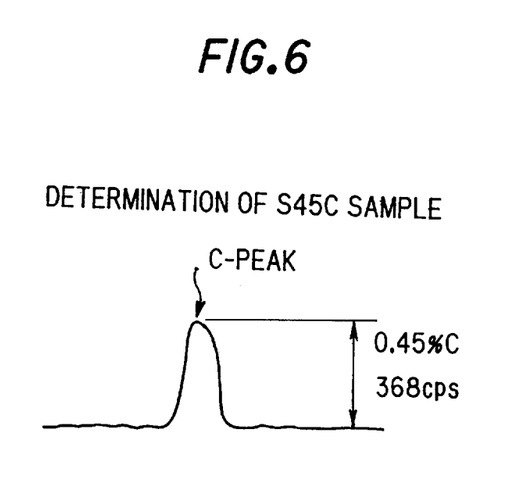
FIG. 6 is an illustration to detect and measure C-quantity.

A method of detecting and analyzing C will now be described with reference to FIG. 6. FIG. 6 shows a C-peak which is obtained when determining a carbon steel with 0.45% C with EPMA (electron probe microanalyzer), model JCMA 773 manufactured by Nippon Denshi, under the conditions indicated below. A count at the L-value of the analyzer was 308 cps. Employing this as an index value, the count for 1% C is determined to be 817 cps by a proportional calculation. A count by EPMA is obtained by counting Ck α-ray (satisfying the condition of L-value of 124.6 mm) from characteristic X-rays produced from a sample as a secondary emission when the sample is irradiated with an electron beam.

C determining conditions with EPMA

Voltage: 10 kV

Current: 3.7×10$^{-7}$ A

L-value: 124.6 mm

Spectroscopy crystal: stearite (commonly referred to as STE)

It is found by the present inventor that when the degree of diffusion of Sn is compared between a usual overlay layer and a distinct overlay layer in which the amount of organic components in the conventional plating bath is intentionally increased, the diffusion of Sn is remarkably suppressed in the latter. To achieve such an effect, the overlay layer must contain 0.02 percent by weight or more of C. However, when the quantity of C exceeds 0.5% by weight, C presents a coarse non-metallic interposition in the plated film, which acts as a point of initiating of exfoliation fraction, causing a degradation of the bearing characteristic. Accordingly, the quantity of C must be equal to or less than 0.5% by weight. A preferred quantity of C is in a range from 0.1 to 0.5% by weight, and a more preferable quantity is from 0.2 to 0.4% by weight.

A plating bath to prepare a lead alloy for the overlay layer is disclosed in the Japanese Patent Publication No. 41,695/85, for example, and contains lead borofluoride, $Pb(BF_4)_2$, borofluoric acid, HBF, hydroquinone, peptone, gelatin and β-naphthol. Describing the functioning of the organic components which are added as plating components, hydroquinone serves as a reducing agent during the electrolysis, the peptone and gelatin serve as dendrite precipitation inhibitors, and β-naphthol serves to finely divide crystal grains, it being believed that in these manners, they contribute to stabilizing plating qualities. According to the Patent Publication cited above, the composition of the plating bath includes lead borofluoride, $Pb(BF_4)_2$, in an amount from 40 to 200 g/l, borofluoric acid, HBF, in an amount from 30 to 120 g/l, hydroquinone in an amount from 0.5 to 3 g/l, peptone in an amount from 0.1 to 3 g/l, gelatin in an amount from 0.1 to 3 g/l, and β-naphthol in an amount from 0.1 to 3 g/l. In addition, a plating bath which plates a Pb—Sn alloy overlay additionally contains tin borofluoride, $Sn(BF_4)_2$, and plating bath which plates Pb—Cu alloy additionally contains copper borofluoride, $Cu(BF_4)_2$.

When plating a Pb—In alloy overlay, a sulfamic acid indium plating bath is used (see Patent Publication No. 41,695/85). The bath composition contains sulfamic acid indium in an amount from 40 to 210 g/l, sulfamic acid in an amount from 10 to 60 g/l, salt in an amount from 15 to 100 g/l, glucose in an amount from 2 to 25 g/l, triethanolamine in an amount from 1 to 5 g/l, and sulfamic acid sodium in an amount from 70 to 320 g/l. Describing the functioning of the organic components which are added, the sulfamic acid serves as an ionizer for In or as antioxidant, glucose serving as a dendrite precipitation inhibitor, and the sulfamic acid sodium and triethanolamine serving as stabilizers of the plating bath. They are blended into the bath in anticipation of these functions, thereby contributing to the stabilizing of the plating qualities.

An overlay layer containing C can be formed by using a neutral bath which has been used in the art in bright plating, in addition to the use of a more conventional borofluoride bath or sulfide bath. Where the overlay layer comprises an alloy, the alloy of these metal components may be formed by an alloy plating. Alternatively, these metals may be plated alone and then alloyed together by diffusion. When single metal plating is conducted several times, one of these layers may be formed by conducting a plating under a condition which allows C to be introduced from an organic component.

An increased amount of C can be introduced into the overlay layer by increasing the amount of components such as hydroquinone, peptone, gelatin, β-naphthol, cresol sulfonate, or formalin, which are used in a conventional borofluoride plating bath and which are present in the bath. Organic components which are used in the present embodiment are not limited in their varieties, provided they allow incorporation into the plating bath in an amount above a given quantity.

Examples of preferred organic components are polycarboxylic acid or its ester compound as disclosed in Japanese Patent Publication No. 48,874/83 for use as a bright plating additive for metals, or a water soluble polymer obtained by polymerization of an organic halide polycarbonyl compound and polyamine. Specifically, polycarboxylic acid includes an aliphatic polycarboxylic acid (for example, oxalic acid, malonic acid, succinic acid, glutamic acid, adipic acid, salicylic acid, pimelic acid, suberic acid, azelaic acid, sebacic acid, fumaric acid, itaconic acid, glutamic acid, nitroacetic acid, ethylendiaminetetraacetic acid and the like), or an aromatic polycarboxylic acid (such as phthalic acid, isophthalic acid, terephthalic acid, diphenylcarboxylic acid, trimellitic acid, methaphenilenediaminetetraacetate).

Another example of preferred organic components includes an aliphatic or aromatic aldehyde disclosed as an Sn and Sn-alloy plating additive in Japanese Patent Publication No. 48,874/83. The aliphatic aldehyde specifically includes formaldehyde, acetaldehyde, propionaldehyde, glyoxalaldehyde, succinic aldehyde, caproic aldehyde, and aldol aldehyde. An aromatic aldehyde specifically includes benzaldehyde, p-tolualdehyde, salicylaldehyde, veratraldehyde, anisaldehyde, piperonal and vanillin.

A further example of preferred organic components is hydroxycarboxylic acid other than citric acid or its salt (hereafter abbreviated as "hydroxycarboxylic acid") or its salt, and/or dibasic carboxylic acid having no unsaturated bond (hereafter abbreviated as "dibasic carboxylic acid") or its salt, disclosed as a stabilizing additive for an Sn or Sn-alloy plating bath in Japanese Patent Publication No. 15,716/85. The hydroxycarboxylic acid specifically includes tartaric acid, malic acid, glycolic acid, glyceric acid, lactic acid, β-hydroxypropionic acid or the like. The dibasic carboxylic acid specifically includes oxalic acid, malonic acid, succinic acid, tartaric acid, adipic acid and the like. Organic compounds which are particularly preferred are carboxylic acid and malic acid.

C which is derived from a variety of brightener materials added to a neutral plating bath having pH in a range from 4 to 9 is effective to prevent the diffusion of Ni, which constitutes the intermediate layer, and Sn in the overlay layer which is particularly diffusible, and thus is capable of providing a higher anti-seizure resistance to the overlay layer, even though its quantity may be of the same order as the quantity of C that is derived from hydroquinone, peptone, gelatin, β-naphthol, cresol sulfonate, and formalin, which are used in a conventional plating bath.

Figure 7:
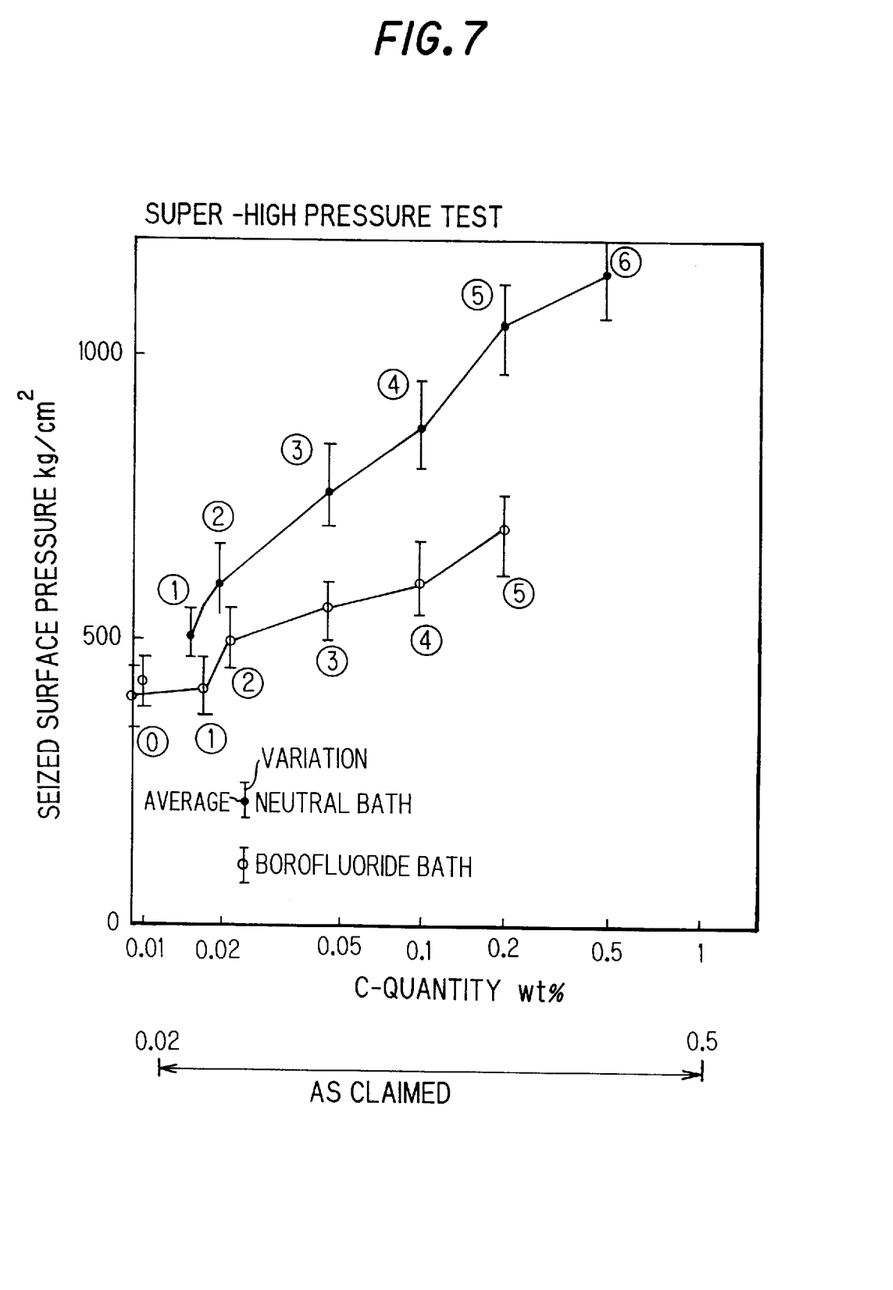
FIG. 7 graphically illustrates a relationship between the seized surface pressure and the C-quantity.

C which is added to the overlay layer in the present embodiment enhances the anti-seizure resistance, as illustrated in FIG. 7. FIG. 7 illustrates the result of a super-high pressure test of a bearing, under the conditions given below, which is formed by providing a lining member having a composition of Al-11% Sn-1.5% Pb-2.8% Si-1% Cu-0.2% Zr alloy, to which an Ni plated intermediate layer which is 0.5 m thick is applied, and on which an Sn overlay layer having a thickness of 5±2 μm is formed according to the description given below and under the conditions given in Tables 1 and 2:

Borofluoride bath No. 1 to 5, basic compositions

| Bath composition: | tin borofluoride | serving as supplying $Sn^{2+}$ions, 18 g/l |
|---|---|---|
| | borofluoric acid | 120 g/l |
| | gelatin | none |
| | β-naphthol | none |

Borofluoride composition No. 0

| Bath composition: | tin borofluoride | as supplying $Sn^{2+}$ ions, 18 g/l |
|---|---|---|
| | borofluoric acid | 120 g/l |
| | gelatin | none |
| | β-naphthol | 2 g/l |

-continued

Neutral Sn bath, No. 1 to No. 6, basic compositions (controls)

| | |
|---|---|
| tin sulfate | 28 g/l, as converted to metal Sn |
| inorganic ammonium salt (conduction aid and antioxidant) | 100 g/l |
| organic carboxylic acid | 20 g/l |

TABLE 1

NEUTRAL BATH

| No. | ORGANIC CARBOXYLIC ACID CONCENTRATION (g/l) | BATH TEMPERATURE (°C.) | CURRENT DENSITY (A/dm$^2$) |
|---|---|---|---|
| ① | 20 | 20 | 3 |
| ② | 40 | 20 | 3 |
| ③ | 80 | 23 | 3 |
| ④ | 100 | 23 | 3 |
| ⑤ | 150 | 23 | 3 |
| ⑥ | 200 | 23 | 3 |

TABLE 2

BOROFLUORIDE BATH

| No. | GELATIN CONCEN-TRATION (g/l) | β-NAPHTHOL CONCEN-TRATION g/l | BATH TEMPERATURE (°C.) | CURRENT DENSITY (A/dm$^2$) |
|---|---|---|---|---|
| ① | 1 | 4 | 20 | 4 |
| ② | 1 | 6 | 20 | 4 |
| ③ | 1 | 7 | 20 | 3 |
| ④ | 2 | 7 | 20 | 3 |
| ⑤ | 3 | 8 | 25 | 5 |

Super-high pressure testing conditions

| | |
|---|---|
| number of revolutions: | 1300 rpm |
| oil variety/temperature: | 7.5 W – 30/140 ° C. |
| shaft variety: | S45C |
| overlay layer thickness: | 5 ± 2 μm |
| heat treatment: | none |
| Ni plating: | 0.5 μm |

Referring to FIG. 7, the borofluoride bath is produced by components which are used in forming a conventional overlay layer by plating. A 0 (zero) mark corresponds to the concentration produced by a conventional plating component, and encircled 1 to 5 marks represent increased concentrations of gelatin and β-naphthol than before. A neutral bath is obtained by adding an organic carboxylic acid, which acts as a brightening agent, with a changed concentration to a basic plating bath of tin sulfate, the pH of which is adjusted to about from 6 to 7. It is seen that in each bath, the seized surface pressure increases as the C-quantity is increased. However, the seized surface pressure for the overlay layer, C of which is derived from the brightening agent, is higher than the seized surface pressure for an overlay layer, C of which is derived from gelatin and β-naphthol.

Figure 8:
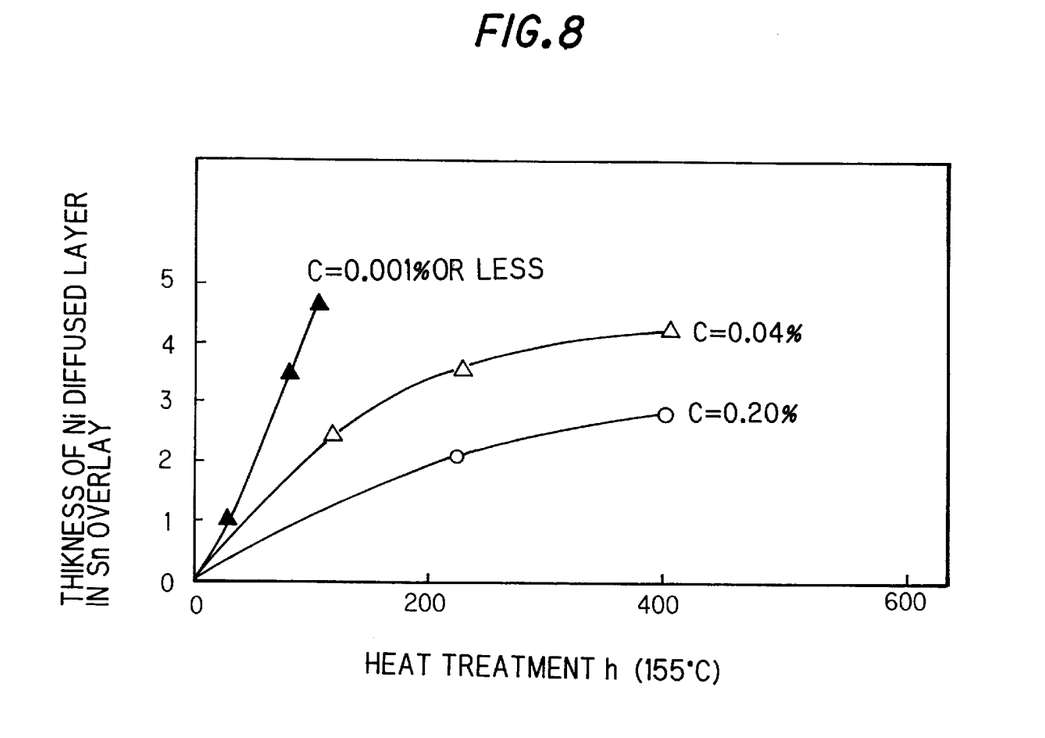
FIG. 8 graphically shows a diffused thickness of Ni within a Sn overlay layer, employing C-quantity as a parameter.

FIG. 8 graphically illustrates the result of the measurement of the influence of the C-quantity in the overlay layer upon the thickness of Ni which is diffused into the Sn overlay layer, for a sliding bearing including an alloy lining member having the composition of Al-11% Sn- 1.5% Pb- 2.8% Si- 1% Cu- 0.2% Zr, to which an Ni plated intermediate layer having a thickness of 0.3 μm (however, for C=0.001% or less, the thickness is increased to 1 μm) is applied, and on which an Sn overlay layer having a thickness of 5±2 μm is formed, the bearing being subject to a heat treatment at 155° C. It is to be noted that the overlay layer for C=0.001% and 0.04% is formed by the borofluoride bath, and the overlay layer for C=0.20% is formed by the neutral bath, both by plating. It will be apparent from FIG. 8 that C present in the overlay layer retards the rate of diffusion of Sn, thus maintaining the thickness of Ni which is diffused into the Sn overlay layer low.

While the reason that C retards the rate of diffusion is not understood, it is believed that the diffusion is inhibited because C is predominantly disposed at a crystal defect which provides a path for an Sn atom when it is diffused. When the diffusion of Sn is suppressed, the depletion of Sn within the overlay layer is also suppressed. In this respect, the performance of the overlay layer such as anti-corrosion resistance and anti-seizure resistance is maintained in a stable manner during the use of the bearing.

In addition, C is effective to improve the anti-seizure resistance of the overlay layer itself. While the reason therefore is not understood, it is considered that the shear resistance presented by friction with a mating member is reduced by C which is dispersed within the overlay layer. When the shear resistance is reduced, the overlay layer will be shaved little by little by the mating shaft, and this prevents an unevenness of a greater magnitude from being produced which would likely cause an agglomeration with a mating member or to produce a rapid increase in the coefficient of friction, with the consequence that a phenomenon which leads to seizure is suppressed.

What is claimed is:

1. A sliding bearing comprising a lining member having an outer surface with a plurality of uneven surface portions with recesses formed therein, said lining member outer surface having a roughness of from 2 to 8 μmRz, an intermediate layer having a thickness of from 0.01 to 0.6 μm coated on the outer surface of the lining member, including the recesses of the uneven surface portions, and an overlay layer containing from 0.02 to 0.5% by weight carbon coated on the intermediate layer and filling said recesses, wherein when the overlay layer and the intermediate layer abrade to form an exposed surface, said exposed surface comprises the outer surface of the lining member, the intermediate layer and the overlay layer provided in the recesses.

2. A sliding bearing according to claim 1, in which a material for the intermediate layer comprises a member selected from the group consisting of Ni, Cu, Cr, Fe and alloys thereof.

3. A sliding bearing according to claim 1, in which the material for the overlay layer contains Sn or In.

4. A sliding bearing according to claim 1, in which the thickness of the overlay layer is from 2 to 25 μm.

5. A sliding bearing according to claim 4, in which the thickness of the overlay layer is from 2 to 10 μm.

6. A sliding bearing according to claim 4, in which the thickness of the overlay layer is from 3 to 8 μm.

7. A sliding bearing according to claim 1, in which the overlay layer contains 0.1 to 0.5% by weight of C.

8. A sliding bearing according to claim 1, in which the overlay layer contains 0.2 to 0.4% by weight of C.

* * * * *